Dec. 21, 1937.  C. H. GREEN  2,103,202
LEG ADJUSTER
Filed Oct. 24, 1933
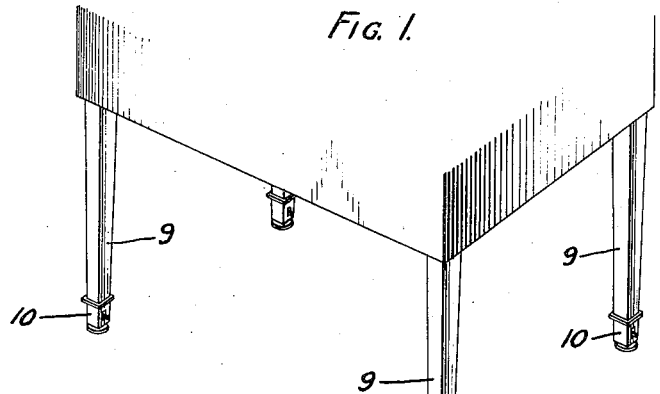
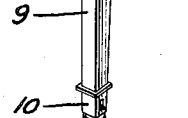
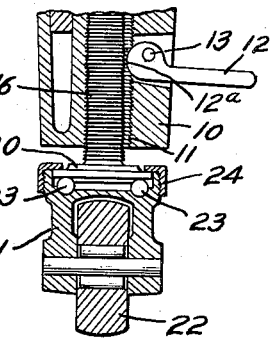
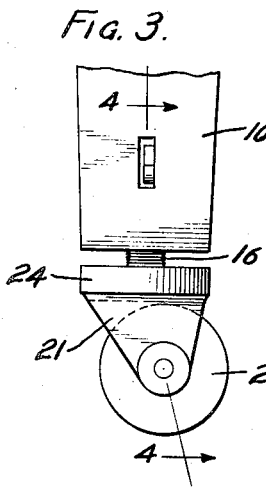
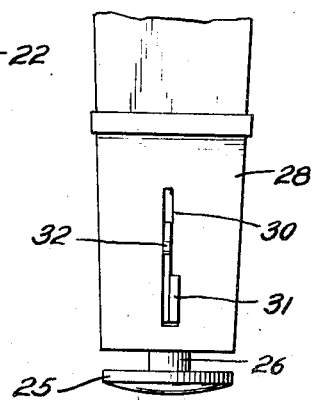
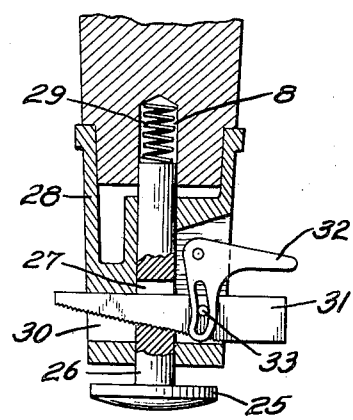
INVENTOR.
Clifford H Green
BY
ATTORNEY.

Patented Dec. 21, 1937

2,103,202

UNITED STATES PATENT OFFICE 2,103,202

LEG ADJUSTER

Clifford H. Green, Grand Rapids, Mich., assignor to Automatic Instrument Company, a corporation of Michigan Application October 24, 1933, Serial No. 694,987

2 Claims. (Cl. 45—139)

This invention relates to means for adjusting supporting legs so that they contact simultaneously with the floor.

Objects of the invention are to provide a readily operable adjusting means which can be quickly set to stabilize the table; to provide a device which can be operated by merely lifting a corner of the table and kicking a lever on the lower end of the leg.

Further objects are to provide a unitary table leg adjuster which can be manufactured completely assembled for mounting on the lower ends of the legs, and to provide a leg adjuster particularly adapted for adjusting the table for stabilizing, in the manner described in my copending application, Ser. No. 694,986, filed at even date herewith.

Fig. 1 is a perspective view of the lower portion of a cabinet having an embodiment of this invention installed thereon.

Fig. 2 is a cross section taken through the lower end of one of the supporting legs shown in Fig. 1.

Fig. 3 is an elevation showing a caster incorporated in the form shown in Fig. 2.

Fig. 4 is a section on the line 4—4 of Fig. 3.

Fig. 5 is an elevation of a modified form of the adjusting means.

Fig. 6 is a section taken on the line 6—6 of Fig. 5.

In the form shown in Fig. 1 and Fig. 2, a hole 8 is drilled in the lower ends of one or more of the legs 9, and the end of the leg is formed to receive a cast metal ferrule 10 having a slightly off-center corrugated bore 11. At one side, a slot 10a extends into the bore; and in the slot is mounted a cam lever 12, pivoted on a pin 13 inserted through the walls of the ferrule 10.

The floor contact or foot member consists of a convex surfaced disc 15 which has a grooved shank 16 terminating in a reduced stem 17 which extends into the hole 8. On the end of the stem is riveted a washer 18 which prevents the foot member from dropping out of the ferrule; and a coiled spring 19 is compressed between the washer and the bottom of the hole 8, which functions to urge the foot member outwardly and into firm contact with the floor. The grooves in the shank conform to the corrugations in the bore 11; but the outside diameter of the shank is less than the inside diameter of the bore so that the foot can move up and down in the bore, by shifting laterally, when the cam is disengaged from the shank.

In making the adjustment, the protruding end of the cam lever is raised with the foot, the corner of the table is pulled upwardly, and then the lever is shoved down so that its cam surface 12a forces the shank over into engagement in the grooves in the bore 11, and the foot is thereby held in adjustment.

In the form shown in Fig. 3 and Fig. 4 a centrally embossed disc 20 is formed integrally with the shank 16, to which is rotatably secured a roller fork casting 21 which has a castor wheel 22 rotatably mounted therein. Ball bearings 23, or other suitable anti-friction devices, are interposed between the upper surface of the member 21 and the disc 20, and the member 21 is rotatably secured to the disc by means of a threaded flange ring 24.

In Fig. 5 and Fig. 6, a disc shaped foot 25 has a smooth shank 26, which is slotted at 27 and which extends upwardly through the ferrule 28, and loosely into the hole 8 in the leg. A spring 29 is inserted in the hole for pressing the foot member downwardly.

The lower portion of the ferrule 28 has a transversely extending slot 30 in which is inserted a wedge 31 which extends through the slot 27 in the shank so that, by forcing the wedge inward, to the left in Fig. 6, the foot may be pressed downwardly into solid contact with the floor.

The ends of the wedge 31 project out of the ferrule, and the wedge may be operated by driving it in or out, or by raising or lowering a bell crank lever 32. The lever 32 is pivotally mounted in the ferrule and is slotted to engage a pin 33 which is inserted through the side of the wedge. This lever affords a ready means of operating the wedge to effect quick adjustments, and also prevents the wedge and foot pieces from dropping out and being lost.

Having thus described my invention, I claim:

1. In a table leg adjustment comprising a ferrule for mounting on the lower end of the leg, the ferrule having a transversely grooved bore, a foot having a similarly grooved stem slidable in the bore, the stem being smaller in diameter than the bore, and a cam rotatably mounted in the side of the ferrule and having a lever arm projecting from the ferrule accessible for manual operation to wedge the stem over against the opposite side of the bore.

2. A table leg adjustment comprising a ferrule having a transversely grooved longitudinal bore, a foot having a stem extending loosely through the bore, a washer riveted to the upper end of the stem to retain the stem loosely in the ferrule, a spring seated on the washer to press the foot downward, and a cam rotatably mounted in the side of the ferrule for wedging the stem laterally into locking engagement in the bore.

CLIFFORD H. GREEN.